(12) United States Patent
Weinstein et al.

(10) Patent No.: US 7,414,830 B2
(45) Date of Patent: Aug. 19, 2008

(54) DEVICE HAVING A SLIDABLE COVER

(76) Inventors: Marc Chase Weinstein, 740 Bryant Ave., Roslyn Harbor, NY (US) 11576; Alfredo Cinco, 170 L. Gruet St., San Juan, Metro Manila (PH) 1500

( * ) Notice: Subject to any disclaimer, the term of this patent is extended or adjusted under 35 U.S.C. 154(b) by 96 days.

(21) Appl. No.: 10/590,532

(22) PCT Filed: Mar. 23, 2006

(86) PCT No.: PCT/US2006/010646

§ 371 (c)(1),
(2), (4) Date: Aug. 24, 2006

(87) PCT Pub. No.: WO2006/102541

PCT Pub. Date: Sep. 28, 2006

(65) Prior Publication Data

US 2007/0285880 A1    Dec. 13, 2007

Related U.S. Application Data

(60) Provisional application No. 60/664,330, filed on Mar. 23, 2005.

(51) Int. Cl.
*G06F 1/16* (2006.01)
(52) U.S. Cl. .................................................. 361/681
(58) Field of Classification Search ................ 361/679, 361/681; 708/160
See application file for complete search history.

(56) References Cited

U.S. PATENT DOCUMENTS

| | | | | |
|---|---|---|---|---|
| 3,622,720 A | * | 11/1971 | Allen | ........................ 200/50.1 |
| 4,224,675 A | * | 9/1980 | Pinkerman | ................... 708/106 |
| 4,398,086 A | * | 8/1983 | Smith, III | ..................... 463/46 |
| 4,731,945 A | * | 3/1988 | Howard | ........................ 40/491 |
| 4,745,397 A | * | 5/1988 | Lagerbauer et al. | ........... 341/23 |
| 4,878,055 A | * | 10/1989 | Kasahara | ..................... 341/23 |
| 4,882,471 A | * | 11/1989 | Kai | .............................. 235/10 |
| 5,457,643 A | * | 10/1995 | Vahey et al. | ................. 361/683 |
| 5,471,254 A | * | 11/1995 | Claassen | ..................... 348/734 |
| 5,530,234 A | * | 6/1996 | Loh et al. | .................. 235/61 R |
| D372,932 S | * | 8/1996 | Tamura et al. | ............. D14/345 |
| 5,555,157 A | * | 9/1996 | Moller et al. | ................ 361/683 |
| D389,463 S | * | 1/1998 | Kasahara | ................... D14/425 |
| 5,964,823 A | * | 10/1999 | Terriss et al. | ................. 708/160 |
| 6,034,866 A | * | 3/2000 | Nobuchi et al. | ............. 361/681 |
| 6,178,085 B1 | * | 1/2001 | Leung | ........................ 361/683 |
| 6,182,386 B1 | | 2/2001 | Nielsen et al. | |
| 6,239,968 B1 | * | 5/2001 | Kim et al. | ................... 361/679 |
| 6,249,431 B1 | * | 6/2001 | Chan | .......................... 361/685 |
| 6,606,762 B1 | * | 8/2003 | Levine et al. | ................. 16/286 |
| 2005/0286212 A1 | * | 12/2005 | Brignone et al. | ............. 361/679 |

FOREIGN PATENT DOCUMENTS

GB    2211323 A  *  6/1989
JP    2002182592     6/2002

* cited by examiner

*Primary Examiner*—Lisa Lea-Edmonds
(74) *Attorney, Agent, or Firm*—Lawrence C. Edelman

(57) ABSTRACT

The present invention relates to a method and apparatus for providing an image in conjunction with a protective cover panel for a device, which device includes a component which can benefit from protection by the cover panel. The cover panel is moveable with respect to the component so as to provide an image change in an area positioned adjacent the cover panel when a user of the device moves the cover panel so as to uncover the component.

12 Claims, 4 Drawing Sheets

DEVICE HAVING A SLIDABLE COVER

CROSS-REFERENCE TO RELATED APPLICATIONS

This application claims priority under 35USC 120 of U.S. Provisional Patent Application No. 60/664,330 filed Mar. 23, 2005, entitled "Electronic Device Having A Slidable Cover". The entire disclosure of this patent application is incorporated herein by reference in its entirety.

BACKGROUND OF THE INVENTION

1. Field of the Invention

The present invention relates to a method and apparatus for providing an image in conjunction with a protective cover panel for a device, which device includes a component which can benefit from protection by the cover panel The cover panel is moveable with respect to the component so as to provide an image change in an area positioned adjacent the cover panel when a user of the device moves the cover panel so as to uncover the component.

SUMMARY OF THE INVENTION

A device assembly includes at least one component, such as an LCD display or keypad for an electronic device embodiment of the invention, mounted in the housing of the device, which component can benefit from protection. A protective cover panel is slidably mounted to the housing and moveable to first and second positions relative to the housing so as to selectively provide a protective cover over the component, and an area positioned adjacent the cover panel is selectively used to provide to a user of the device a view of an image. In one embodiment, the cover panel has a first portion that forms a protective barrier for the component, and a second portion coupled with and positioned in juxtaposition to the first portion, which second portion includes at least one image therewith. When the cover panel is in the first position, the first portion is aligned with the component so as to form a protective cover over the component, and, depending upon the embodiment, at least one image of the second portion may or may not be visible to a user of the device. As the cover panel is moved from the first position to the second position, the first portion is moved so as to progressively allow the component to be accessible to the user of the device, and the second portion is moved so as to progressively extend past the housing of the device and thereby progressively reveal more of the at least one image included with the second portion.

In an alternative embodiment of the invention, the second portion of the cover panel can include two image substrates positioned for movement therewith, so that a combined image from both substrates is visible when the cover panel is in the second position, but only the image from one substrate is visible in the area to the user of the device when the cover panel is in the first position.

In a further alternative embodiment of the invention, the second portion of the cover panel comprises a substrate including only a single image. In this embodiment the single image from the substrate is visible when the cover panel is in the second position, but when the cover panel is in the first position, the image from that substrate is hidden behind a portion of the device housing. In accordance with another feature of this embodiment of the invention, when the cover panel is in the first position, a further image that is positioned on an outwardly facing portion of the device housing and aligned with the single image, is visible in the area.

A method for providing the above-noted features is also described.

BRIEF DESCRIPTIONS OF THE DRAWINGS

The accompanying drawings, which are incorporated herein and constitute part of this specification, illustrate embodiments and details of the invention, and, together with the general description given above and the detailed description given below, serve to explain various embodiments and aspects of the invention.

These and other advantages of the invention will become apparent upon reading the following detailed description and upon referring to the drawings in which.

Figure 1:
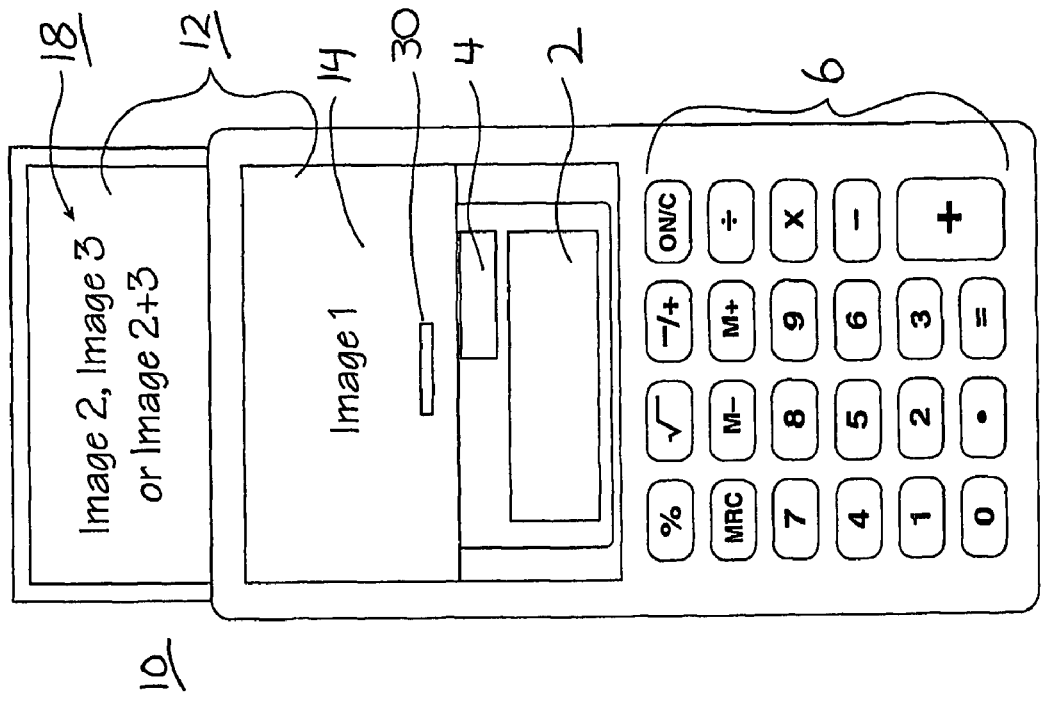
FIG. 1 shows a calculator embodiment of the invention, wherein the cover is in a closed position.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention.

DETAILED DESCRIPTION OF THE PREFERRED EMBODIMENTS

In a preferred embodiment of the present invention, the device 10 comprises a handheld or desk calculator, but can include any type of device which will benefit from a protective cover that moves in order to gain access to a component of the device. For example, when the device is an electronic device, the component may comprise an LCD display 2, a solar panel 4, or keypad 6, which is part of a calculator, PDA, a cell phone, etc, and if the device is not electronic, the component may be, for example, a portion of writing tablet. The component of the device can even comprise a compartment which is selectively openable by movement of the protective cover.

In the embodiment of the invention shown in the drawings, a sliding panel 12 includes a lower portion 14 that covers the LCD display 2 and solar panel 4 of a calculator 10, so as to provide protection for the LCD display 2 from scratching, dust or breakage when the device is not in use. As a matter of design choice, cover portion 14 of panel 12 may also include thereon an image, such as indicated by "Image 1". In this illustrated embodiment panel 12 also includes an upper portion 18 that forms a viewing area by comprising an opening that reveals an "Image 2" printed on a substrate (24 of FIGS. 4 & 5) that is aligned with the area 18. In this embodiment, this substrate can be mounted to a portion of the panel 12 so as to move in coordination therewith, such as shown by "Image 2" printed on substrate 24 in FIGS. 1-5. In some of the alternative embodiments described below, area 18 may not be a portion of panel 12.

In order to reveal the LCD screen for use, the user pushes upward on a tab 30 formed on cover 14. The panel 12 is slidable relative to the housing of the device, using any one of several well known slidable mounting techniques, such as tracks or by using a groove, etc, not specifically shown.

In operation, as the panel 12 slides upward, the upper portion thereof, comprising in this illustrated embodiment area 18, moves progressively beyond the confines of the housing of calculator 10. As it moves, more and more of the image in the area 18 is revealed.

In accordance with a simplified aspect of this embodiment, the Image 2 is progressively moved in conjunction with movement of cover portion 14.

In accordance with a further aspect of the invention, the panel 12 can include first and second supplemental image substrates 24 and 26, mounted on or to the panel 12 so as to be viewable through the area 18 as the panel is moved from the first position to the second position, i.e., as it moves past the confines of the housing of calculator 10. The substrate 24 having the first supplemental image may be translucent and include Image 2 thereon which may be graphically correlated with and "adds-to" the second supplemental image, "Image 3", included on substrate 26. For example, in one embodiment, Image 2 may be a relatively low contrast black and white image, while Image 3 is a color image which is graphically coordinated with Image 3, so that as Image 2 and Image 3 combine during sliding movement of panel 12, the increasingly combined image presented to the viewer appears to magically transform from the black and white Image 2 into the color Image 2+3.

Figure 4:
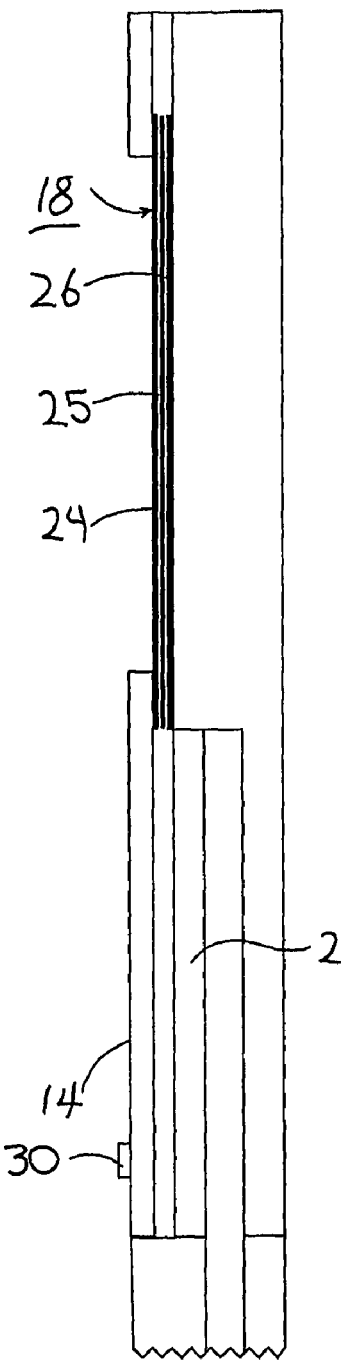
FIGS. 4 and 5 show enlarged side-section views of the top portion of the calculator embodiment of the invention in the closed and then open position, as shown in FIGS. 1 and 2, respectively.
Figure 5:
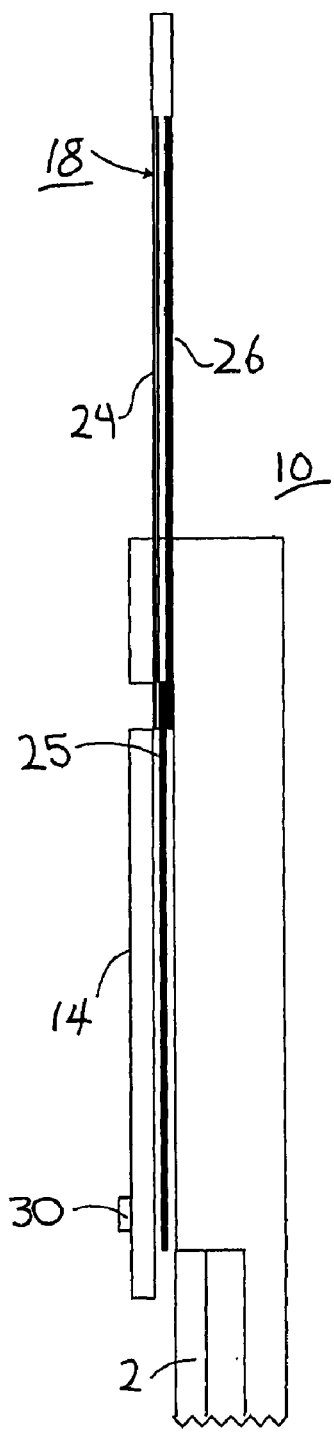

More specifically, in this embodiment, the housing of calculator 10 includes a "divider substrate" 25 mounted at a fixed position therein, such as a white card, and the two supplemental image substrates 24 and 26 (having Images 2 and 3, respectively, printed or otherwise formed thereon) are positioned so that one substrate falls on either side of the white card 25, as shown in FIGS. 4 and 5. When the panel is in the first position, only the translucent image of substrate 24 is visible through the area 18, since it is on front of the white card 25. However, as noted above, an exciting effect happens as the panel 12 is moved to the second position, since the first and second supplemental images combine as the area extends past the boundary of the white card 25 and the border of the housing of calculator 10, thereby changing the "display" in the area 18 from only the Image 2 on the first substrate, to the combined Image 2+3 of the first and second substrates.

Figure 2:
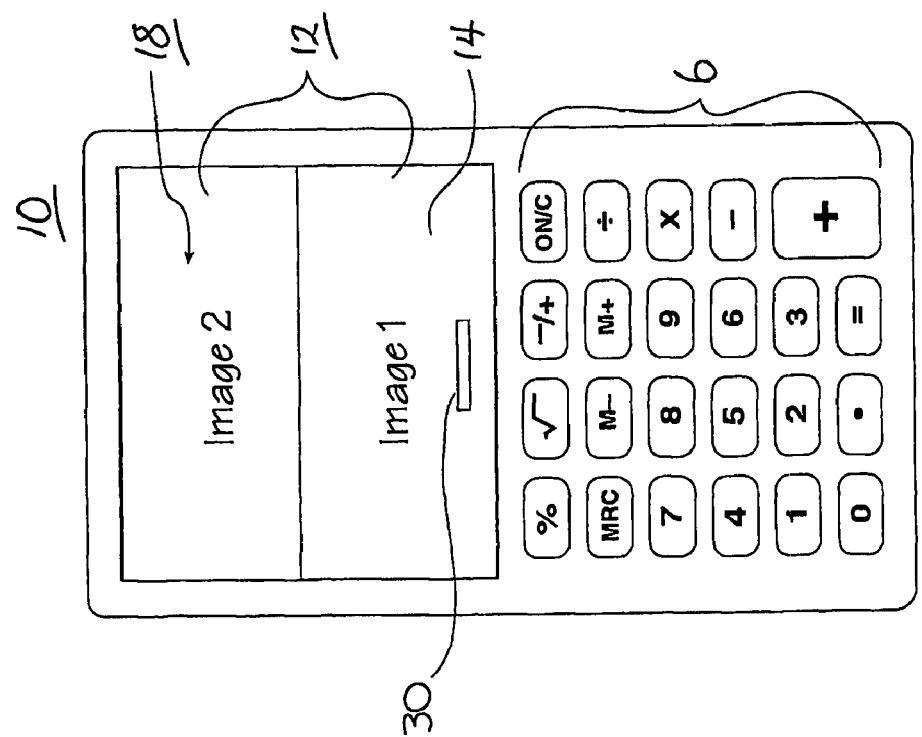
FIG. 2 shows the calculator embodiment of the invention, wherein the cover is in an open position.
Figure 3:
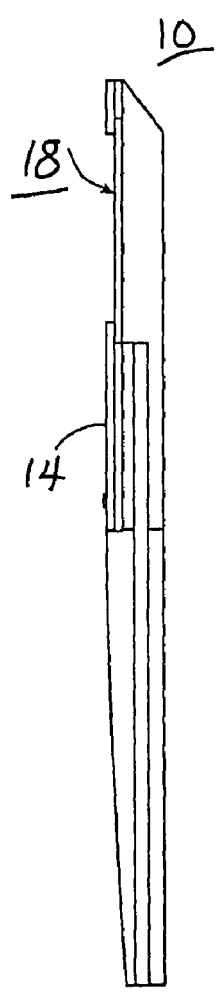
FIG. 3 shows a side-section view of the calculator embodiment of the invention, wherein the cover is in the closed position such as shown in FIG. 1.

It is noted that in accordance with an alternative embodiment of the invention shown more clearly in FIGS. 6 and 7 described in more detail below, but also possible with the embodiment shown by FIG. 2, only the supplemental image substrate 26 may be used to form an Image 3 viewable through the area 18 as the panel is moved past the confines of the housing of calculator 10. In this embodiment, when the panel is moved to the second position, the original Image 2 displayed in the area 18 (if an Image 2 is in fact used) is no longer visible, since it is hidden behind the lower portion 14 of panel 12, as Image 3 is progressively revealed.

Thus, all of the embodiments of the invention described above make dual use of the user's movement of the protective panel to gain visual access to the LCD display, the first use being the conventional and expected use of uncovering the LCD display, but the second use being that the same movement also creates a separate and distinct effect by revealing an image, which can be visually exciting or provide information for the user.

While this invention has been particularly shown and described with references to preferred embodiments thereof, it will be understood by those skilled in the art that various changes in form and details may be made therein without departing from the sphere and scope of the invention. In fact, many such changes are already noted in this description but it should be realized that the above-noted changes were not exhaustive, and merely exemplary. Those skilled in the art will recognize, or be able to ascertain using no more than routine experimentation, many equivalents to the specific embodiments of the invention described herein.

For example, as described above, the image visible using the area 18 adjacent cover 14 may not be an image that appears to move in coordination with movement of the cover 14, and instead may be a non-changing and fixed position image. This alternative is shown, for example, in FIGS. 6 and 7 where the area 18 adjacent the cover 14 shows as the image an "Image 2" that is printed on the outside of the housing of calculator 10, and as such, does not move relative to the movement of the cover 14. Image 2, for example, can be a message, such as: "What's Your. Dose?" However, when the cover 14 is moved upward, an Image 3 printed on a substrate 33, which is normally hidden behind that portion of the housing having Image 2, is progressively revealed in area 18, as shown in FIG. 7, as it moves past the housing in coordination with the movement of the cover 14. Image 3 may include the message: "Your Dosage Is 150 mg.".

Additionally, the image graphically illustrated as "Image 1", may or may not be formed or printed on the lower portion (cover) 14 of the panel 12, as a matter of design choice.

Figures 6, 7:
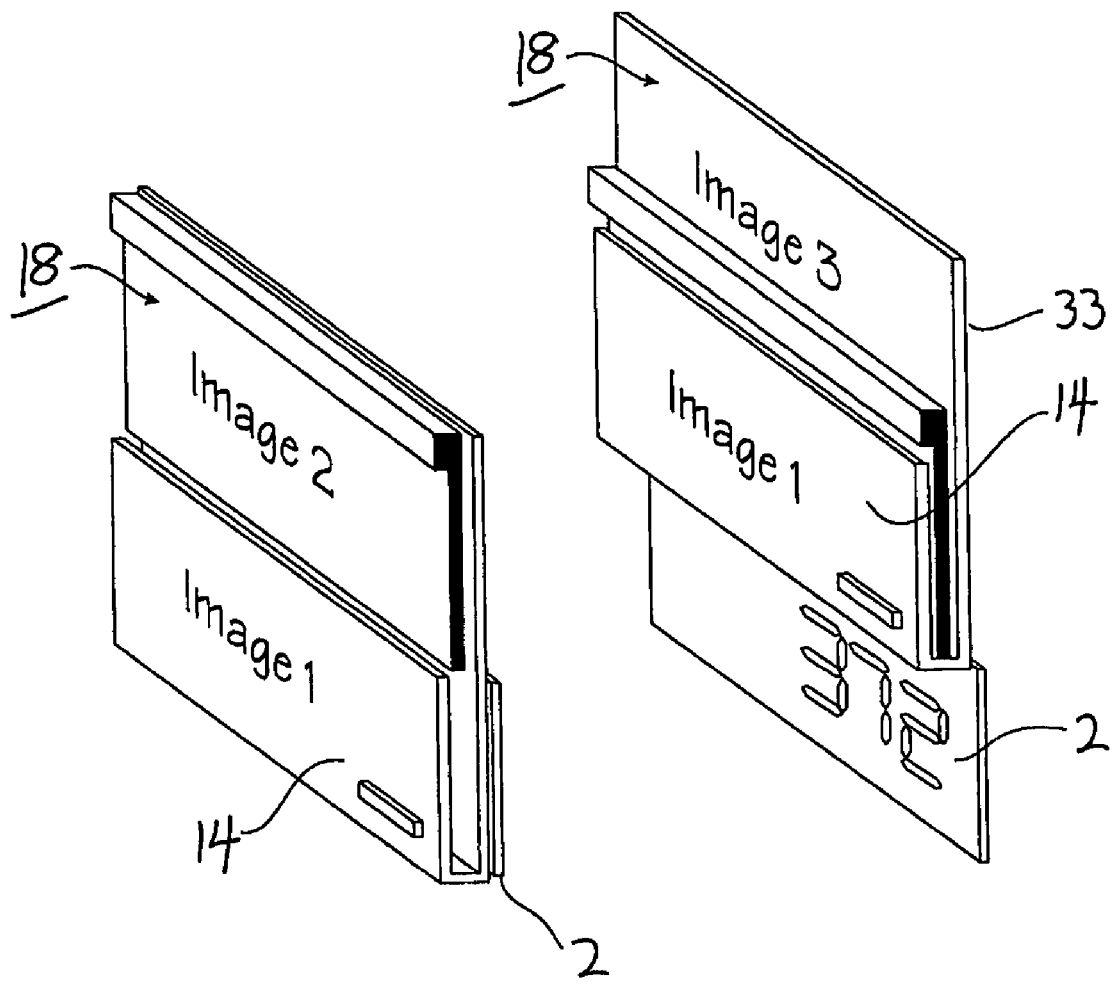
FIGS. 6 and 7 show enlarged side-perspective views an alternative embodiment of the top portion of a further calculator embodiment of the invention.

In a further alternative embodiment, there may not be an Image 2 in the area 18, unlike the embodiments shown in shown in FIGS. 1 or 6 which include Image 2 in area 18.

Figures 8, 9:
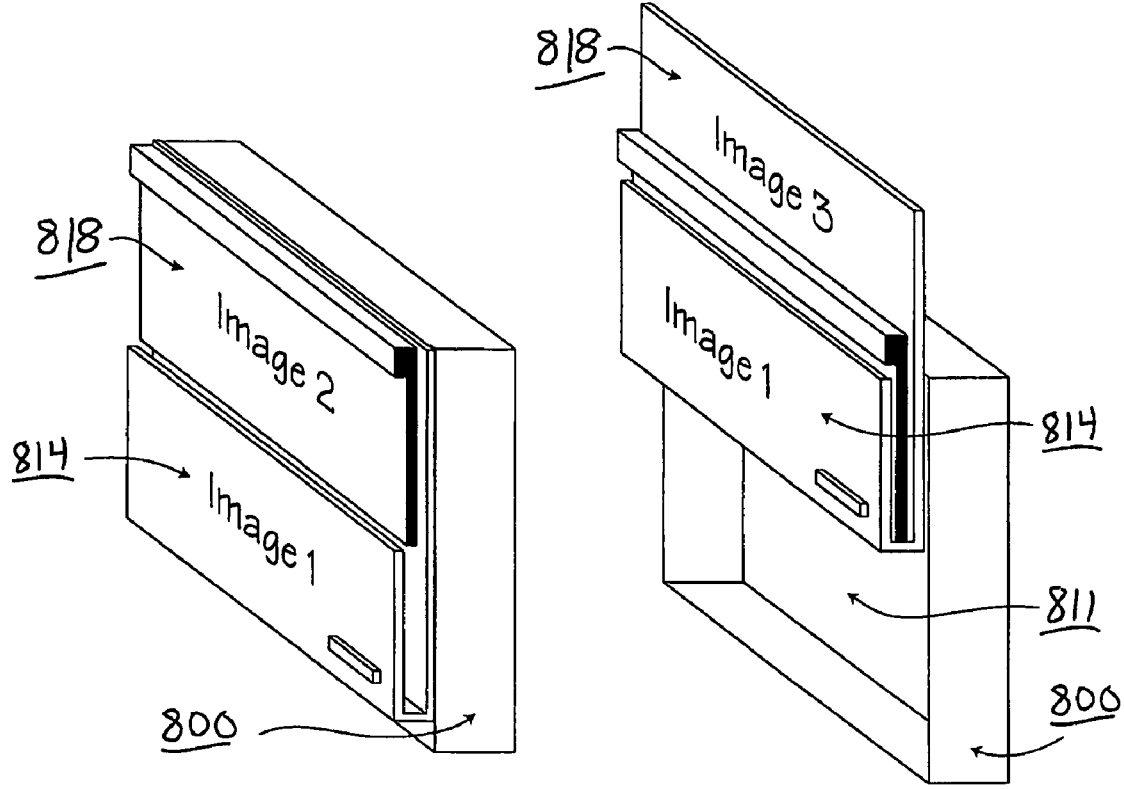
FIGS. 8 and 9 illustrate a storage compartment embodiment of the invention, where a cover for the compartment is shown in the closed and then open position, respectively.

In an even further alternative embodiment, the component needing protection may be an opening in a storage compartment. Such an alternative is shown by FIGS. 8 and 9, which FIGS. respectively illustrate a storage compartment 800 having an opening 811 that is selectively closed or opened in response to movement of a cover 814. An image display area 818 is adjacent cover 814. In operation, cover 814 and area 818 function in substantially the same manner that cover 14 and area 18 function as shown and described in relation to FIGS. 6 and 7. Consequently, the advantages of providing a changing and exciting visual effect upon operation of a cover to selectively open or close a compartment, can also be provided by the invention.

What is common to all embodiments of the invention, is the fact that "an Image" is progressively revealed in area 18 as the cover 14 is moved to provide user access to the component.

Thus, there has been provided in accordance with the invention a method and apparatus to achieve an exciting visual effect or provide additional image or information, when moving a protective panel on an electronic device, which fully satisfies the objects, aims and advantages set forth above. While the invention has been described in conjunction with specific embodiments thereof, it is evident that many further alterative, modifications and variations will be apparent to those skilled in the art in light of the foregoing description. Accordingly, it is intended to embrace all such alternatives, modifications and variations as fall within the spirit and broad scope of the invention.

The invention claimed is:

1. A device assembly (10) which includes at least one component which can benefit from protection, the assembly comprising:
   a housing for the device assembly (10),
   a component (2) on the housing,
   a protective cover panel (14) slidably mounted respect to the housing and moveable between first and second positions relative to the housing so as to selectively provide a protective cover over, or access to, the component (2), and
   an area (18) including a substrate having at least one image thereon, which substrate is positioned adjacent to the cover panel and which area (18) is used to selectively provide to a user of the device assembly (10) a view of the at least one image (Image 2, Image 3, or Image 2+3), wherein
   when the cover panel (14) is in the first position it is aligned with the component so as to form a protective cover over the component and the at least one image on the substrate of area (18) is positioned behind a portion of the device assembly and thereby hidden from the view of the user, and as the cover panel is moved from the first position to the second position, the component becomes progressively more accessible to the user of the device, and the area (18) is progressively moved so as to extend past the housing of the device so that the at least one image thereon becomes progressively more visible to the user.

2. The assembly of claim 1, wherein when the cover panel is in the first position, the area (18) forms a viewing window which provides to the user a view of a further image that is positioned on the portion of the device housing.

3. The assembly of claim 1, where the area (18) comprises a slidable device coupled with the cover panel (14), the slidable device including first and second image substrates (24, 26) positioned relative to the housing so as to be moveable in conjunction with movement of the cover panel (14), said first and second image substrates being configured so that a combined image from both substrates is visible when the cover panel is in the second position, but only the image from one substrate is visible to the user in the area (18) when the cover panel is in the first position.

4. The assembly of claim 3, where said first and second image substrates include a respective one of first and second image thereon, and where a solid white sheet-like member having a fixed position with respect to the housing is positioned between the first and second substrates, so that as the cover panel is moved from the first position to the second position, the image in the area (18) seems to change from the first image to the combined first and second image.

5. The assembly of claim 1, where a first image is printed on an outside facing portion of the housing that is adjacent to the component, so that when the cover panel (14) is in the first position the first image is aligned with the area (18), and when the cover panel (14) is moved toward the second position, a second image is progressively revealed in area 18 in coordination with the movement of the cover panel (14).

6. The assembly of claim 1, where an even further image is provided on the cover panel (14).

7. The assembly of claim 1, where the device comprises an electronic device.

8. The assembly of claim 7, where the electronic device comprises a calculator and the component comprises a display portion of the calculator.

9. The assembly of claim 1, where the component comprises a storage compartment.

10. A method for providing a visual effect on device assembly (10) which includes at least one component which can benefit from protection, the method comprising:
    providing a housing for the device assembly (10),
    providing a protective cover panel (14) slidably mounted respect to the housing and moveable between first and second positions relative to the housing so as to selectively provide a protective cover over, or allow access to, a component (2) of the housing, and
    providing an area (18) including a substrate having at least one image thereon, which substrate is selectively positioned adjacent to the cover panel for selectively displaying to a user of the device assembly (10) a view of at least one image (Image 2, Image 3, or Image 2+3), wherein
    when the cover panel (14) is in the first position it is aligned with the component so as to form a protective cover over the component and the at least one image on the substrate of area (18) is positioned behind a portion of the device assembly and thereby hidden from the view of the user, and as the cover panel is moved from the first position to the second position, the component becomes progressively more accessible to the user of the device, and the area (18) is moved so as to progressively extend past the housing of the device and thereby progressively reveal more of the at least one image provided thereon.

11. A device assembly (10) which includes at least one component which can benefit from protection, the assembly comprising:
    a housing for the device assembly (10),
    a component (2) on the housing,
    a protective cover panel (14) slidably mounted respect to the housing and moveable between first and second positions relative to the housing so as to selectively provide either a protective cover over, or access to, the component (2), and
    an area (18) positioned adjacent to the cover panel and used to provide to a user of the device assembly (10) a view of at least one image, the area (18) comprising a slidable device coupled with the cover panel (14), the slidable device including first and second image substrates (24, 26) positioned relative to the housing so as to be moveable in conjunction with movement of the cover panel (14), said first and second image substrates being configured so that a combined image from both substrates is visible to a user of the device assembly (10) when the cover panel is in the second position, but only the image from one substrate is visible to the user in the area (18) when the cover panel is in the first position, and wherein
    when the cover panel (14) is in the first position it is aligned with the component so as to form a protective cover over the component, and as the cover panel is moved from the first position to the second position, the component is progressively more accessible to the user of the device, and the area (18) is progressively moved so as to extend past the housing of the device, thereby progressively allowing the combined image from both substrates to be more visible to the user.

12. A device assembly (10) which includes at least one component which can benefit from protection, the assembly comprising:
    a housing for the device assembly (10),
    a component (2) on the housing,
    a protective cover panel (14) slidably mounted respect to the housing and moveable between first and second positions relative to the housing so as to selectively provide either a protective cover over, or access to, the component (2), and an area (18) positioned adjacent to the cover panel which is used to provide to a user of the device (10) a view of at least one image, wherein when the cover panel (14) is in the first position it is aligned with the component so as to form a protective cover over the component, and as the cover panel is moved from the first position to the second position, the component is progressively more accessible to the user of the device, and the area (18) is progressively moved so as to extend past the housing of the device, and wherein a first image is printed on an outside facing portion of the housing that is adjacent to the component, so that when the cover panel (14) is in the first position the first image is aligned with the area (18), and when the cover panel (14) is moved toward the second position, a second image is progressively revealed in the area (18) in coordination with the movement of the cover panel (14).

\* \* \* \* \*